United States Patent
Mendoza et al.

(10) Patent No.: US 8,699,984 B2
(45) Date of Patent: Apr. 15, 2014

(54) ADAPTIVE NOISE FIGURE CONTROL IN A RADIO RECEIVER

(75) Inventors: Armando J. Mendoza, Chandler, AZ (US); Noshir B. Dubash, Chandler, AZ (US)

(73) Assignee: CSR Technology Inc., San Jose, CA (US)

( * ) Notice: Subject to any disclaimer, the term of this patent is extended or adjusted under 35 U.S.C. 154(b) by 1096 days.

(21) Appl. No.: 12/036,946

(22) Filed: Feb. 25, 2008

(65) Prior Publication Data

US 2009/0215420 A1    Aug. 27, 2009

(51) Int. Cl.
*H04B 1/10* (2006.01)

(52) U.S. Cl.
USPC ....... 455/296; 455/67.11; 455/77; 455/150.1; 455/310; 455/312

(58) Field of Classification Search
USPC ............... 455/67.11, 77, 150.1, 226.2, 226.3, 455/296, 310, 311, 312
See application file for complete search history.

(56) References Cited

U.S. PATENT DOCUMENTS

| | | | |
|---|---|---|---|
| 5,077,541 A * | 12/1991 | Gilbert | 330/284 |
| 5,663,734 A | 9/1997 | Krasner | |
| 5,663,735 A | 9/1997 | Eshenbach | |
| 5,684,431 A * | 11/1997 | Gilbert et al. | 330/254 |
| 5,781,156 A | 7/1998 | Krasner | |
| 5,809,400 A * | 9/1998 | Abramsky et al. | 455/63.1 |
| 5,812,029 A * | 9/1998 | Prentice | 330/278 |
| 5,812,087 A | 9/1998 | Krasner | |
| 5,825,327 A | 10/1998 | Krasner | |
| 5,831,574 A | 11/1998 | Krasner | |
| 5,841,396 A | 11/1998 | Krasner | |
| 5,874,914 A | 2/1999 | Krasner | |
| 5,884,214 A | 3/1999 | Krasner | |
| 5,945,944 A | 8/1999 | Krasner | |
| 5,999,124 A | 12/1999 | Sheynblat | |
| 6,002,363 A | 12/1999 | Krasner | |
| 6,016,119 A | 1/2000 | Krasner | |
| 6,052,081 A | 4/2000 | Krasner | |
| 6,061,018 A | 5/2000 | Sheynblat | |
| 6,064,336 A | 5/2000 | Krasner | |

(Continued)

OTHER PUBLICATIONS

Marketing Material: Qualcomm CDMA Technologies—Integrated Solutions—MGP6200™ Multimode GPS Processor (8 pages).

(Continued)

*Primary Examiner* — Nay A Maung
*Assistant Examiner* — Erica Fleming-Hall
(74) *Attorney, Agent, or Firm* — RatnerPrestia

(57) ABSTRACT

Systems and methods are provided for adjusting a noise figure in a radio receiver. An example method includes receiving a radio frequency (RF) signal at a RF receiver section. The RF receiver section includes at least one RF receiver element. The RF receiver element is controllable by at least one tuning variable. The RF signal is processed to generate a processed analog signal, which is converted to a digital signal. The digital signal is used to determine a performance parameter. The at least one tuning variable of the at least one RF receiver element is controlled to adjust the noise figure based on the performance parameter. In another aspect of the invention, an example radio receiver is provided. The radio receiver includes a RF receiver section having at least one RF receiver element. A controller determines a performance parameter using the digital signal and controls the at least one tuning variable to adjust the noise figure based on the performance parameter.

25 Claims, 10 Drawing Sheets

(56) References Cited

U.S. PATENT DOCUMENTS

| | | |
|---|---|---|
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,185,427 B1 | 2/2001 | Krasner |
| 6,208,290 B1 | 3/2001 | Krasner |
| 6,208,291 B1 | 3/2001 | Krasner |
| 6,215,441 B1 | 4/2001 | Moeglein |
| 6,215,442 B1 | 4/2001 | Sheynblat |
| 6,236,354 B1 | 5/2001 | Krasner |
| 6,239,742 B1 | 5/2001 | Krasner |
| 6,259,399 B1 | 7/2001 | Krasner |
| 6,272,430 B1 | 8/2001 | Krasner |
| 6,289,041 B1 | 9/2001 | Krasner |
| 6,307,504 B1 | 10/2001 | Sheynblat |
| 6,313,786 B1 | 11/2001 | Sheynblat |
| 6,314,308 B1 | 11/2001 | Sheynblat |
| 6,377,209 B1 | 4/2002 | Krasner |
| 6,408,196 B2 | 6/2002 | Sheynblat |
| 6,411,254 B1 | 6/2002 | Moeglein |
| 6,411,892 B1 | 6/2002 | Van Diggelen |
| 6,417,801 B1 | 7/2002 | Van Diggelen |
| 6,421,002 B2 | 7/2002 | Krasner |
| 6,429,814 B1 | 8/2002 | Van Diggelen et al. |
| 6,433,731 B1 | 8/2002 | Sheynblat |
| 6,453,237 B1 | 9/2002 | Fuchs et al. |
| 6,484,097 B2 | 11/2002 | Fuchs et al. |
| 6,487,499 B1 | 11/2002 | Fuchs et al. |
| 6,510,387 B2 | 1/2003 | Fuchs et al. |
| 6,512,472 B1 * | 1/2003 | Smith et al. .................. 341/155 |
| 6,542,821 B2 | 4/2003 | Krasner |
| 6,583,757 B2 | 6/2003 | Krasner |
| 6,597,311 B2 | 7/2003 | Sheynblat |
| 6,724,251 B1 * | 4/2004 | Ziazadeh et al. ................ 330/86 |
| 6,741,634 B1 * | 5/2004 | Kim et al. ..................... 375/144 |
| 7,103,336 B1 * | 9/2006 | Miyajima et al. .......... 455/250.1 |
| 7,200,374 B1 * | 4/2007 | Stephens ...................... 455/254 |
| 7,599,666 B2 * | 10/2009 | Hamalainen et al. ........... 455/69 |
| 8,428,535 B1 * | 4/2013 | Cousinard et al. ......... 455/234.2 |
| 2002/0037705 A1 * | 3/2002 | Moerder et al. ............. 455/115 |
| 2003/0008628 A1 * | 1/2003 | Lindell et al. .............. 455/180.1 |
| 2006/0094395 A1 * | 5/2006 | Lee et al. ..................... 455/333 |
| 2007/0082639 A1 * | 4/2007 | Lindstrom et al. ......... 455/226.3 |
| 2007/0110194 A1 * | 5/2007 | de Obaldia et al. ........... 375/345 |
| 2007/0270115 A1 * | 11/2007 | Kravets ......................... 455/283 |
| 2009/0015256 A1 * | 1/2009 | Bottomley et al. ........... 324/309 |
| 2009/0042527 A1 * | 2/2009 | Niknejad ................... 455/234.2 |
| 2009/0143041 A1 * | 6/2009 | Rofougaran ................. 455/296 |
| 2009/0156145 A1 * | 6/2009 | Lindstrom et al. ......... 455/200.1 |

OTHER PUBLICATIONS

Marketing Material: uNav Microelectronics—uN9x18 Low Power, High Performance GPS Receiver Chipset/uN9x18 GPS Receiver Solution (9 pages).

Marketing Material: uNav Microelectronics, uN9x18 Low Power, High Performance GPS Receiver Chipset (2 pages).

Marketing Material: Global Locate—Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

* cited by examiner ively and automatically reduce the current consumption. It would also be desirable to employ a method or system to tune the noise figure of one or more components in an application to adjust the total system noise figure.

ADAPTIVE NOISE FIGURE CONTROL IN A RADIO RECEIVER

BACKGROUND

1. Field of the Invention

This invention relates generally to communications receiver systems, and more particularly, to systems and methods for controlling affects of noise in signal receivers.

2. Description of Related Art

Electronic circuits that employ amplifiers in applications such as radio frequency (RF) receivers are designed to operate at a fixed noise figure (NF) in order to meet system specifications. Designers attempt through design and simulation efforts to determine where the noise figure operating point will be. However, a multitude of variables make it difficult to guarantee the operating point of the finished product. Such variables include, for example, silicon process variation, packaging assembly and simulation modeling. There may be many others depending on the application. Currently, few options are available for tuning the NF of a low noise amplifier (LNA) after the product has been processed and assembled. In most cases, particularly in the case of other receiver circuits, the NF is fixed and receiver system performance must be accepted.

In addition, LNA's are not the only components in a circuit for which a NF is specified. Other components in any given circuit may also operate at a NF. The circuit or system may therefore operate at a system noise figure, which is a cumulative function of the NF of each circuit element in the receiver chain. Thus, the deleterious effect of the many variables on system performance may be compounded by the cumulative effect on multiple circuit elements in a circuit.

One of the biggest tradeoffs in meeting noise-figure requirements is power consumption. There are numerous methods for reducing power consumption in receivers. Typical implementations shutdown or cutback the current in the receiver circuits, depending on whether the receiver is in normal operating mode or in standby mode. Receivers typically operate in one operating mode at a fixed current and power consumption. In environments with higher signal strength or reduced noise it is possible to maintain receiver performance or functionality at a lower operating current.

It would be desirable to employ a method or system that will dynamically and automatically reduce the current consumption. It would also be desirable to employ a method or system to tune the noise figure of one or more components in an application to adjust the total system noise figure.

SUMMARY

In view of the above, systems and methods are provided for adjusting a noise figure in a radio receiver. An example method includes receiving a radio frequency (RF) signal at a RF receiver section. The RF receiver section includes at least one RF receiver element. The RF receiver element is controllable by at least one tuning variable. The RF signal is processed to generate a processed analog signal, which is converted to a digital signal. The digital signal is used to determine a test parameter. The at least one tuning variable of the at least one RF receiver element is controlled to adjust the noise figure based on the test parameter.

In another aspect of the invention, an example radio receiver is provided. The radio receiver includes a RF receiver section having at least one RF receiver element. The at least one RF receiver element is controllable by at least one tuning variable. The RF receiver section generates a processed analog signal. An analog to digital converter ("ADC") converts the processed analog signal to a digital signal. A controller determines a test parameter using the digital signal and controls the at least one tuning variable to adjust the noise figure based on the test parameter.

Various advantages, aspects and novel features of the present invention, as well as details of an illustrated embodiment thereof, will be more fully understood from the following description and drawings.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of preferred embodiments, reference is made to the accompanying drawings that form a part hereof, and which show, by way of illustration, specific embodiments in which the invention may be practiced. Other embodiments may be utilized and structural changes may be made without departing from the scope of the present invention.

1. LNA Noise Figure Control

Figure 1:
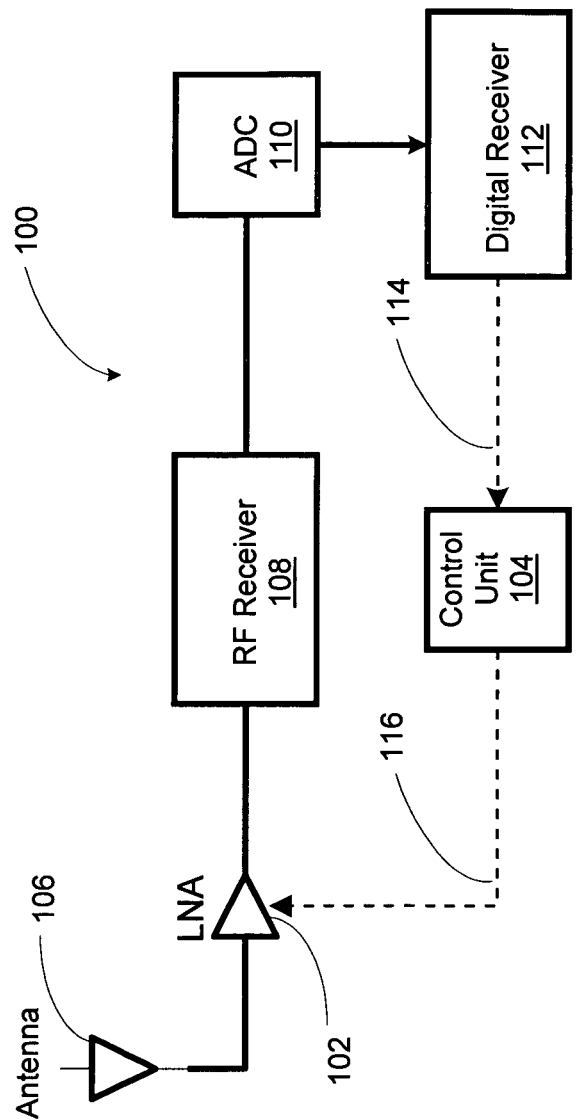
FIG. 1 is a block diagram of an example of a signal receiver having a low-noise amplifier (LNA) and a control unit.

FIG. 1 is a block diagram of an example of a signal receiver 100 having a low-noise amplifier (LNA) 102 and a control unit 104. The signal receiver 100 also includes an antenna 106, a radio frequency (RF) receiver 108, an analog-to-digital converter (ADC) 110, and a digital receiver 112. The signal receiver 100 is a "generic" receiver in that it may be configured to operate in a wide variety of communications applications. The signal receiver 100 receives signals at the antenna 106, which couples signals it receives to the LNA 102. The LNA 102 amplifies the signals and couples the signals to the RF receiver 108. The RF receiver 108 downconverts the signals to a baseband signal and couples the baseband signal to the ADC 110. The ADC 110 converts the analog baseband signal to digital signals, which it couples to a digital receiver unit 112. The digital receiver unit 112 processes the digital signals according to a specific implementation.

In an example implementation, the digital receiver unit 112 may analyze the digital signals to determine particular parameters about the received signals. The control unit 104 may use these parameters in a tuning function to adjust the noise figure of the LNA 102. The parameters are communicated to the control unit 104 over signal line 114. The control unit 104 tunes the noise figure by adjusting a tuning variable of the LNA 102 via control line 116.

The control unit 104 in the example receiver 100 in FIG. 1 may adjust a tuning parameter, such as for example the noise figure of the LNA 102, by controlling a tuning variable, in this example, the bias current of the LNA 102. The control unit 104 may receive test parameters such as measures of system level performance, which may include the signal-to-noise ratio (SNR) of the receiver 100 and/or the carrier-to-noise ratio (CNR) of the receiver 100, and may adjust the bias current according to the SNR and/or CNR.

Figure 2:
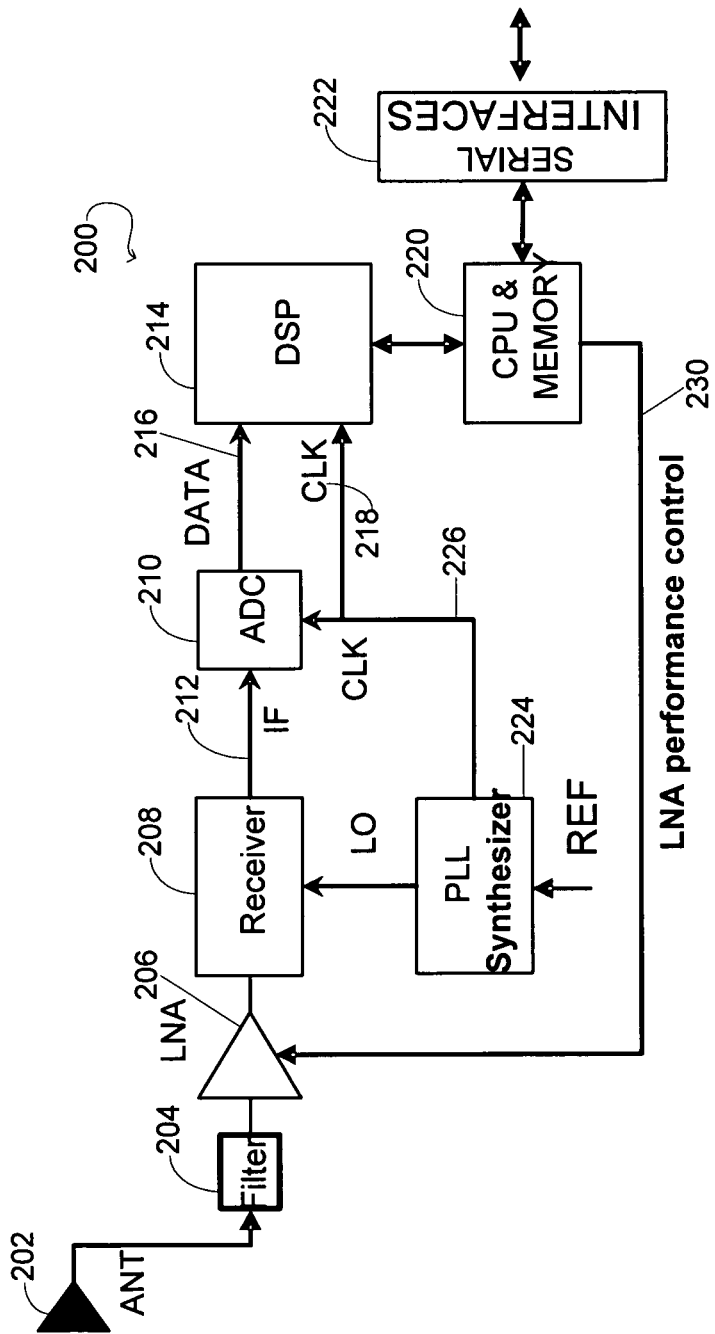
FIG. 2 is a block diagram of an example of the signal receiver in FIG. 1, which may be used as a GPS signal receiver.

FIG. 2 is a block diagram of an example of the signal receiver in FIG. 1, which may be used as a GPS signal receiver 200. The GPS signal receiver 200 in FIG. 2 includes an antenna 202, a filter 204, a LNA 206, a receiver 208, a ADC 210, a digital signal processor (DSP) 214, a controller 220, a serial interface 222, and a phase-lock loop synthesizer 224. The GPS signal receiver 200 receives the GPS RF signal at the antenna 204. The GPS RF signal is filtered by the filter 204 to remove out-of-band interference. The GPS RF signal is amplified by the LNA 206 before being sent to the receiver element 208. In the receiver element 208, the signal is down-converted by mixing with a Local Oscillator (LO) signal generated by the PLL synthesizer 224. The Intermediate Frequency (IF) signal resulting from the downconversion may be further amplified and filtered in the receiver 208 to generate a processed analog signal. The processed analog signal is sent to the ADC 210 over connection 212. The processed analog signal is then digitized by the ADC 210 and sent to the DSP 214 over a digital data interface 216.

In the DSP 214, the IF data samples are decimated and correlated with Pseudo-Random Noise (PRN) sequences to determine which GPS satellite signals are being received. Once the data is correlated, or de-spread, the SNR can be calculated by the controller 220. The controller 220 includes a CPU and memory as well as programmed functions that may be performed by the CPU. The programmed functions in the controller 220 in the GPS signal receiver 200 in FIG. 2 includes tuning functions implemented in hardware and/or software for calculating SNR (or CNR) and for controlling the bias current (or other tuning variable) of the LNA 206. Because there is no gain prior to the LNA 206, the LNA noise directly degrades the SNR of the receiver 208. In decibel units, a 2 dB improvement in LNA noise figure will result in a 2 dB improvement in the final SNR. The controller 220 includes tuning functions to minimize the LNA noise figure.

Examples of tuning functions that may be implemented by the controller 220 are described below with reference to FIGS. 3, 7, 8, and 10.

Figure 3:
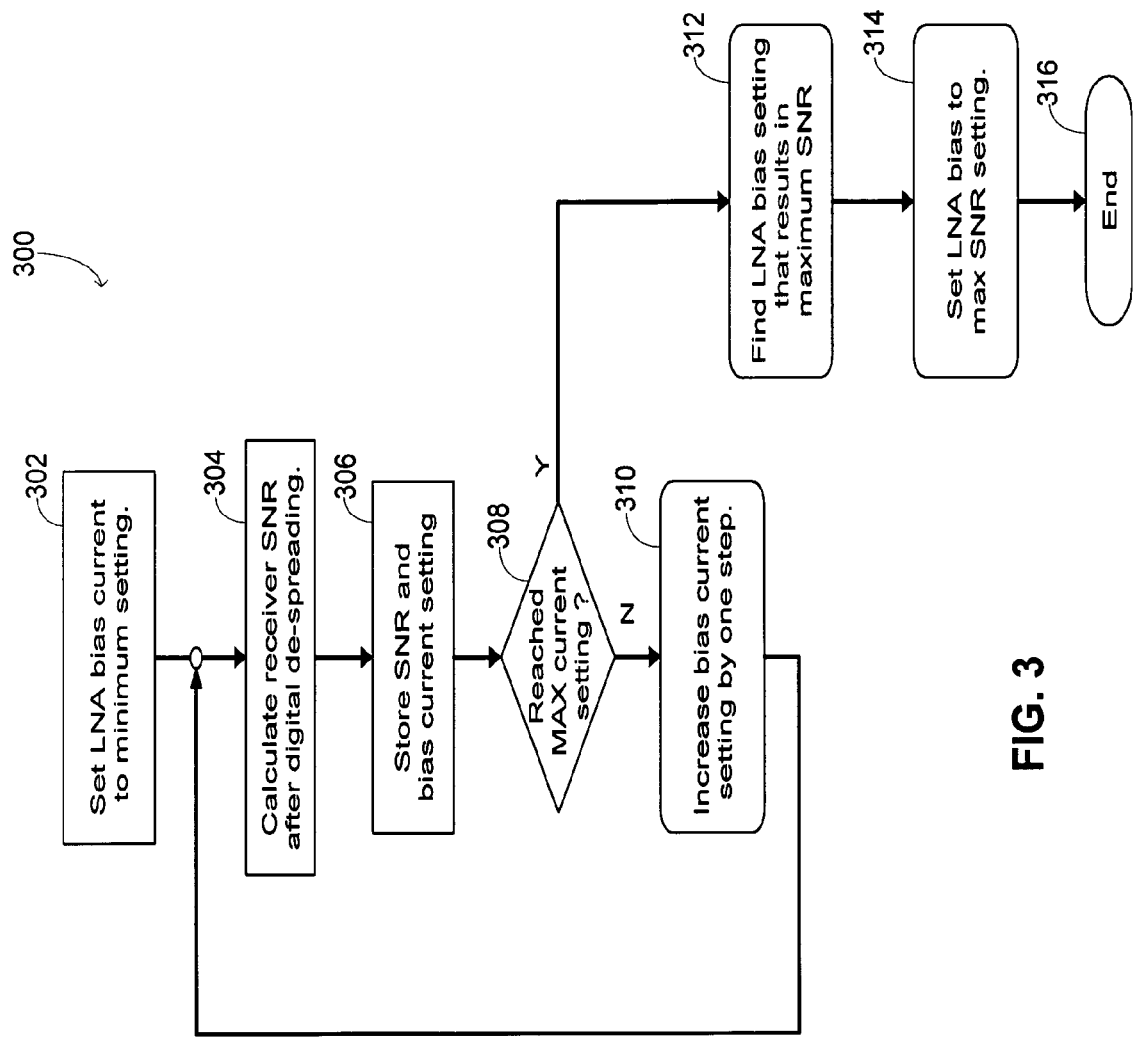
FIG. 3 is a flowchart depicting operation of an example method for tuning the noise figure of a low-noise amplifier (LNA).

FIG. 3 is a flowchart 300 depicting operation of an example method for tuning the noise figure of the LNA 206. The method may be performed as part of a calibration procedure before operating the receiver. The example method illustrated by the flowchart 300 in FIG. 3 does not assume that there is a single maximum point in the SNR vs. Bias Current function. In other example methods, prior knowledge of a single maximum point may result in a more efficient method.

The flowchart in FIG. 3 is described as a method to be performed using the receiver 200 in FIG. 2, however, any suitable receiver may be used. As shown in FIG. 3, the method may begin at an initial state in which the LNA bias current is adjusted to its minimum setting at step 302. With the LNA bias current at its minimum level, the receiver SNR is calculated at step 304. As described above with reference to FIG. 2, the receiver SNR is calculated after digital de-spreading or correlation of the radio signal. The calculated SNR may be stored in a data structure, such as a table, or a database, or set of parameters, with the bias current setting as shown in step 306. Decision block 308 checks the bias current setting to determine if the maximum setting has been reached. If the maximum current has not been reached, the bias current is increased by one step as shown at step 310. The steps of 304, 306, 308, and 310 continue until a SNR value has been calculated for each bias current level between the minimum and maximum bias current levels of the LNA 206. Once the maximum current setting is reached as detected (the 'YES' condition at decision block 308), the resulting set of SNR values is checked for the highest SNR setting at step 312. At step 314, the LNA bias current corresponding to the highest SNR setting determined at step 312 is used as the bias current for the LNA. At step 316, the receiver 200 proceeds to further normal operation.

Figure 4:
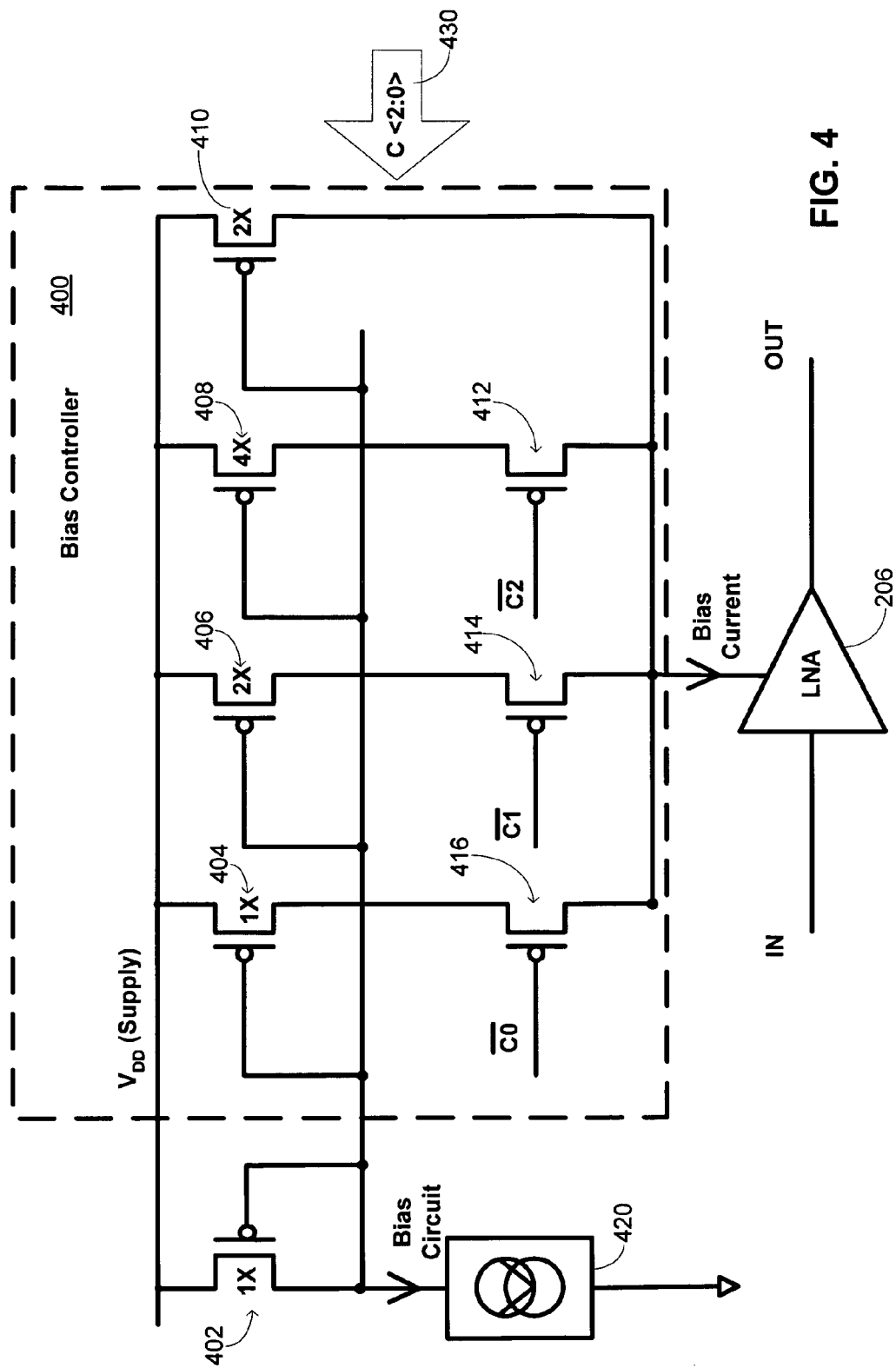
FIG. 4 is a schematic diagram of a bias controller that may be used in the example system in FIG. 1.

In the receiver 200 shown in FIG. 2, the bias control or setting may be a 3-bit digital word C<2:0>, resulting in eight possible current settings for the LNA 206. The current may be adjusted using a bias controller operating with PMOS current mirrors. FIG. 4 is a schematic diagram of a bias controller 400 that may be used in the example system in FIG. 1. The bias controller 400 includes a set of current mirroring transistors 404, 406 and 408 and may be powered using a source transistor 402 connected to a current source 402. The current mirroring transistors 404, 406 and 408 are of sizes 1×, 2× and 4× of the source transistor 402 and are connected in series with a set of switch transistors 412, 414, 416, which are controlled by inverted versions of the digital control signals. The bias controller 400 includes a fourth mirroring transistor 410 of size 2× the source transistor 402 with no series switch. The fourth mirroring transistor 410 sets the bias current level to the minimum bias current. When the bias controller 400 receives a three-bit input c<2:0> at 430, the switch transistors 412, 414, 416 are turned on or off depending on the bit value defined by the three-bit input c<2:0> at 430. For example, a value of 111 for c<2:0> turns the three switch transistors 412, 414, 416 to the OFF state. The value of 111 corresponds to the minimum bias current value as only the fourth mirroring transistor 410 is left in the ON state. A value of 110 turns one of the switch transistors 412, 414, 416 ON as well, adding another current source. The value of the c<2:0> determines a combination of switch transistors 412, 414, 416 to turn ON and to adjust the bias current to a desired level. In the bias controller 400 in FIG. 4, the bias current to the LNA 206 may be varied from 2× to 9× times the original bias current, in steps of 1×.

The bias controller 400 in FIG. 4 is one example of an adjustable bias current source that may be used in an example receiver. Other bias current sources may be used as well.

In addition, other tuning variables besides bias current may be used to optimize the LNA noise figure. For example, another tuning variable that may be adjusted is the input impedance of the LNA 206. The LNA noise figure may be optimized when its internal noise impedance is equal to the source impedance, a condition called a noise match. In a typical application, the source impedance of the LNA 206 changes due to package and board parasitic reactances. The LNA impedance may be tuned to optimize the noise match.

Methods of adjusting the input impedance may include varying the input transistor size using additional transistors that can be switched in or out of the circuit, and/or using negative feedback at the transistor input. The switching of the transistors in or out of the circuit may be controlled by a controller similar to the bias controller 400 in FIG. 4. Other example controllers may be used to control tuning variables that adjust other tuning parameters besides the LNA noise figure, such as the LNA gain.

2. Receiver System Noise-Optimization Via Noise Figure Control

Figure 5:
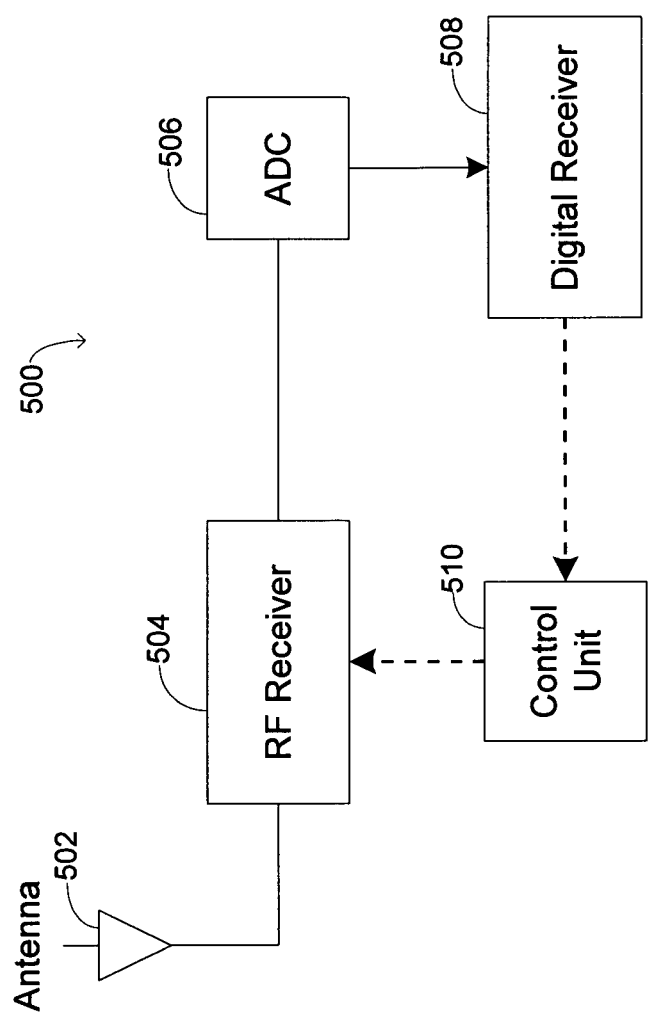
FIG. 5 is an example of a signal receiver having a control unit for providing system noise optimization through noise figure control.

FIG. 5 is an example of a signal receiver 500 having a control unit for providing system noise optimization through noise figure control. The signal receiver 500 includes an antenna 502, an RF receiver 504, an ADC 506, a digital receiver 508, and a control unit 510. As with the signal receiver 100 in FIG. 1, the signal receiver 500 in FIG. 5 is generic in that it may be configured to operate in a wide variety of applications. The antenna 502 receives a signal and couples the signal to the RF receiver 504. The RF receiver 504 demodulates the signal and couples an IF signal to the ADC 506 for conversion to a digital signal. The digital samples generated by the ADC 506 are coupled to the digital receiver 508, which includes functions for determining data or parameters to send to the control unit 510. The control unit 510 may use these parameters to tune the noise figure of the RF receiver 504. The example systems and methods described herein with reference to FIGS. 5-7 perform system optimization by adjusting the noise figure. Examples of systems may also perform system optimization by adjusting other tuning parameters, such as gain.

Figure 6:
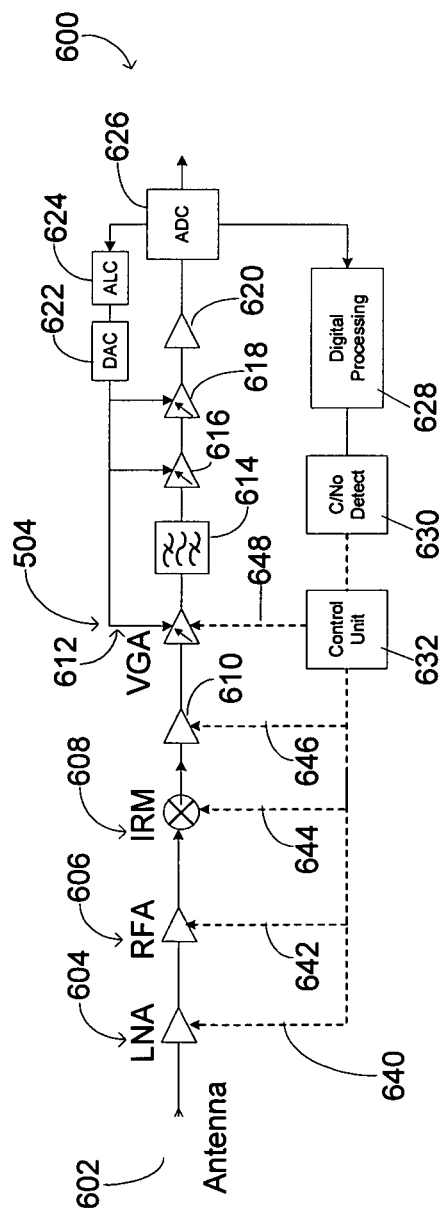
FIG. 6 is an example of a signal receiver having a control unit for tuning the noise figure of components in a receiver element.

The RF receiver 504 in FIG. 5 may include a number of components having a noise figure associated with them. The noise figure of each component may be adjusted, either simultaneously or individually, to optimize the SNR of the signal receiver 500. FIG. 6 is an example of a signal receiver 600 of the type shown in FIG. 5, which includes a control unit for tuning the noise figure of components in a RF receiver element. The signal receiver 600 in FIG. 6 includes an antenna 602, the components or blocks or elements that make up the RF receiver 504, an ADC 626, a controller 628, a C/N detect function 630, and a control unit 632. The RF receiver elements include a LNA 604, a radio frequency amplifier (RFA) 606, an image reject mixer (IRM) 608, a first signal amplifier 610, a first variable gain amplifier (VGA) 612, a bandpass filter 614, a second VGA 616, a third VGA 618, and a second signal amplifier 620. The signal receiver 600 also includes an automatic level control (ALC) 624 and a digital-to-analog converter 622, which provide a control loop to control the gain of the first VGA 612, second VGA 616, and the third VGA 618.

In the example shown in FIG. 6, the control unit 632 may adjust or tune the noise figure of selected RF receiver elements, such as the LNA 604, RFA 606, IRM 608, second RFA 610, and the first VGA 612. The control unit 632 may control the RF receiver elements simultaneously or individually. The LNA 604 may be tuned by adjusting a tuning parameter, such as the bias current, at line 640. The RFA 606 may be tuned by adjusting a tuning parameter at line 642. The IRM 608 may be tuned by adjusting a tuning parameter at line 644. The second RFA 610 may be tuned by adjusting a tuning parameter at line 646. The first VGA 612 may be tuned by adjusting a tuning parameter at line 648. Control of the tuning parameters may be based on the SNR or the CNR, which may be determined by the controller 628. The RF receiver system-noise may be optimized by controlling the noise figure of the RF receiver elements.

Figure 7:
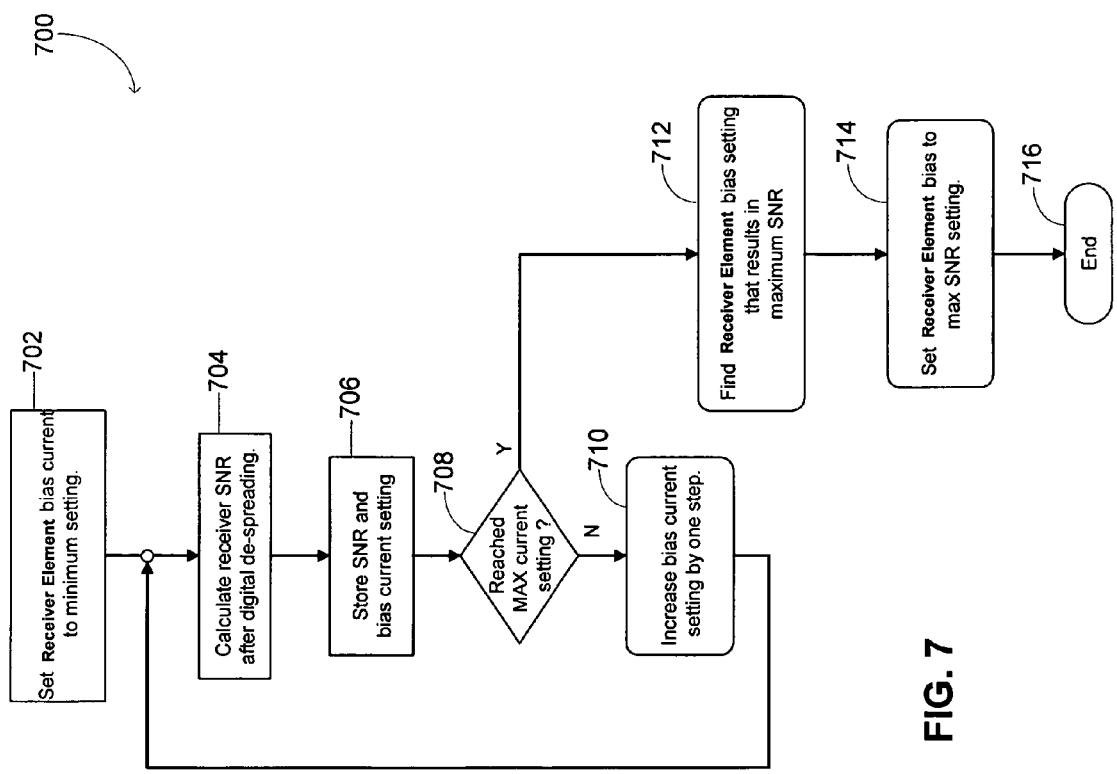
FIG. 7 is a flowchart depicting operation of an example of a method for optimizing system noise performance by controlling the noise figure of the receiver.

FIG. 7 is a flowchart depicting operation of an example of a method for optimizing system noise performance by controlling the noise figure of the RF receiver. The flowchart in FIG. 7 is described as a method to be performed using the receiver 600 in FIG. 6, however, any suitable receiver may be used. Control of the noise figure of the RF receiver 504 may be achieved by adjusting the tuning parameter of the receiver elements, either simultaneously, individually, or in selected combinations. The selection of receiver elements to tune may be determined by a tuning algorithm, which may be determined according to design tradeoffs used in the implementation of the receiver 600. For some receivers 600 simultaneous tuning may be appropriate whereas for other receivers 600 some receiver elements may be tuned independently and some may not be tuned at all. Other tuning variables besides bias current include impedance tuning, which may be performed by adjusting variable capacitors, switched capacitors, switched transistor sizes, and/or negative feedback.

In the description that follows, the tuning variable that is adjusted is the bias current to a receiver element. It is to be understood that a receiver element may include any of the components that may be in the RF receiver 504 in FIGS. 5 and 6, such as the LNA 604, RFA 606, IRM 608, second RFA 610, and the first VGA 612, whether alone or in combination.

As shown in FIG. 7, the method may begin at an initial state in which the receiver element bias current is adjusted to its minimum setting at step 702. With the receiver element bias current at its minimum level, the receiver SNR is calculated at step 704. A previous step or steps may be added to specify which component or components of the receiver make up the receiver element whose bias current is to be adjusted. The components may also be selected by a function that invokes the function implementing the method illustrated by the flowchart 700 in FIG. 7.

As described above with reference to FIGS. 5 and 6, the receiver SNR is calculated after digital de-spreading or correlation of the radio signal. The calculated SNR may be stored in a data structure, such as a table, or a database, or set of parameters, with the bias current setting as shown in step 706. Decision block 708 checks the bias current setting to determine if the maximum setting has been reached. If the maximum current has not been reached, the bias current is increased by one step as shown at step 710. The steps of 704, 706, 708, and 710 continue until a SNR value has been calculated for each bias current level between the minimum and maximum bias current levels of the receiver element. Once the maximum current setting is detected (the 'YES' condition at decision block 708), the resulting set of SNR values is checked for the highest SNR setting at step 712. At step 714, the receiver element bias current corresponding to the highest SNR setting determined at step 712 is used as the bias current for the receiver element bias current. At step 716, the receiver proceeds to further normal operation. At step 716, the receiver may proceed to a function that sets one or more other components in the receiver as the receiver element. The function implementing the method illustrating the flowchart 700 in FIG. 7 may then be performed again with new component(s) set as the receiver element.

3. Circuit and Receiver Power Minimization Via Noise-Figure Control Loop

In some examples of receiver systems, methods may be implemented for reducing power consumption in the RF receiver and its circuit elements using methods for controlling the noise figure of the receiver. Minimization of power consumption may be implemented by determining possible receiver operating points. For example, one receiver operating point may involve high signal strength that would tolerate a higher noise figure to reduce receiver power consumption. Another receiver operating point may involve a weak signal environment where lowest NF is required.

The operating point and corresponding current consumption can be adjusted using a method that determines the optimum operating point to achieve required receiver performance and minimize power consumption based on system requirements and the signal environment. An example method may be implemented using the control units 104 in FIG. 1 and 510 in FIG. 5 to control the receiver noise figure by adjusting various tuning parameters.

Figure 8:
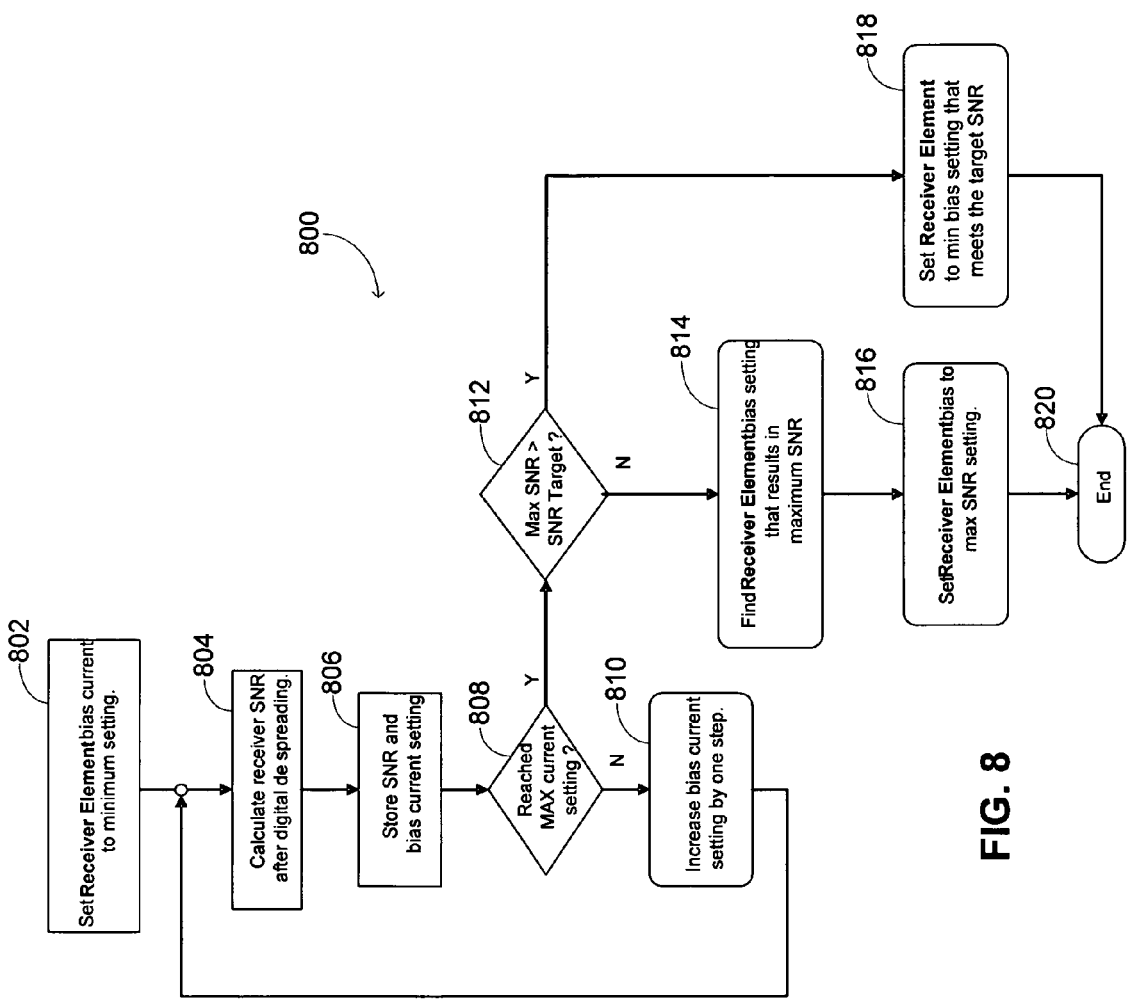
FIG. 8 is a flowchart depicting operation of an example of a method for minimizing power consumption according to receiver system requirements.

FIG. 8 is a flowchart depicting operation of an example of a method 800 for minimizing power consumption according to receiver system requirements. In the following description of FIG. 8, receiver element includes one or more components in the receiver 600 in FIG. 6. The system requirements may be defined by a target test parameter, such as a target SNR or CNR.

The method 800 may begin at an initial state in which the receiver element bias current is adjusted to its minimum setting at step 802. With the receiver element bias current at its minimum level, the receiver SNR is calculated at step 804. A previous step or steps may be added to set specify which component or components of the receiver make up the receiver element whose bias current is to be adjusted. The components may also be selected by a function that invokes the function implementing the method illustrated by the flowchart 800 in FIG. 8. As described above with reference to FIGS. 5 and 6, the receiver SNR is calculated after digital de-spreading or correlation of the radio signal. The calculated SNR may be stored in a data structure, such as a table, or a database, or set of parameters, with the bias current setting as shown in step 806. Decision block 808 checks the bias current setting to determine if the maximum setting has been reached. If the maximum current has not been reached, the bias current is increased by an incremental tuning variable level, which may be a step of current as shown at step 810. The steps of 804, 806, 808, and 810 continue until a SNR value has been calculated for each bias current level between the minimum and maximum bias current levels of the receiver element.

Once the maximum current setting is detected at decision block 808, the maximum calculated SNR value is checked to determine if it is greater than a specified target SNR at decision block 812. If the maximum SNR reached is greater than the target SNR, the set of current bias values is searched to retrieve the minimum bias current setting that meets the target SNR at step 818. If the maximum SNR is not greater than the target SNR (the 'NO' condition at decision block 812), the current bias settings is searched for a current bias setting that results in a maximum SNR at step 814. The receiver elements bias current is set to the max SNR current bias setting at step 816. The signal receiver continues with normal operation at step 820.

As shown in the description above with reference to FIG. 8, the method illustrated by the flowchart 800 may be used to optimize power consumption by adjusting the receiver bias current according to the system requirements.

4. Radio Receiver Signal-to-Noise Ratio Adaptive Control Through Noise-Figure and Gain Control Loop Example signal receivers may include adaptive optimized noise-figure and/or gain for improved receiver system performance by enhancing signal quality available for digital decoding. Reduced power consumption may also be achieved by not allowing circuit elements to operate at a higher current operating point than needed to meet system performance.

In some examples, the bias current and gain settings may be adjusted to optimize linearity, which may assist in the detection of a jamming environment. If the SNR is low it could be due to a very weak signal or to a jammer, and the receiver has to determine which is the case. One way to determine that is to monitor the VGA settings. For example, an ALC may set a VGA to a very low setting. If the resulting SNR is low, the presence of a jammer is indicated.

Figure 9:
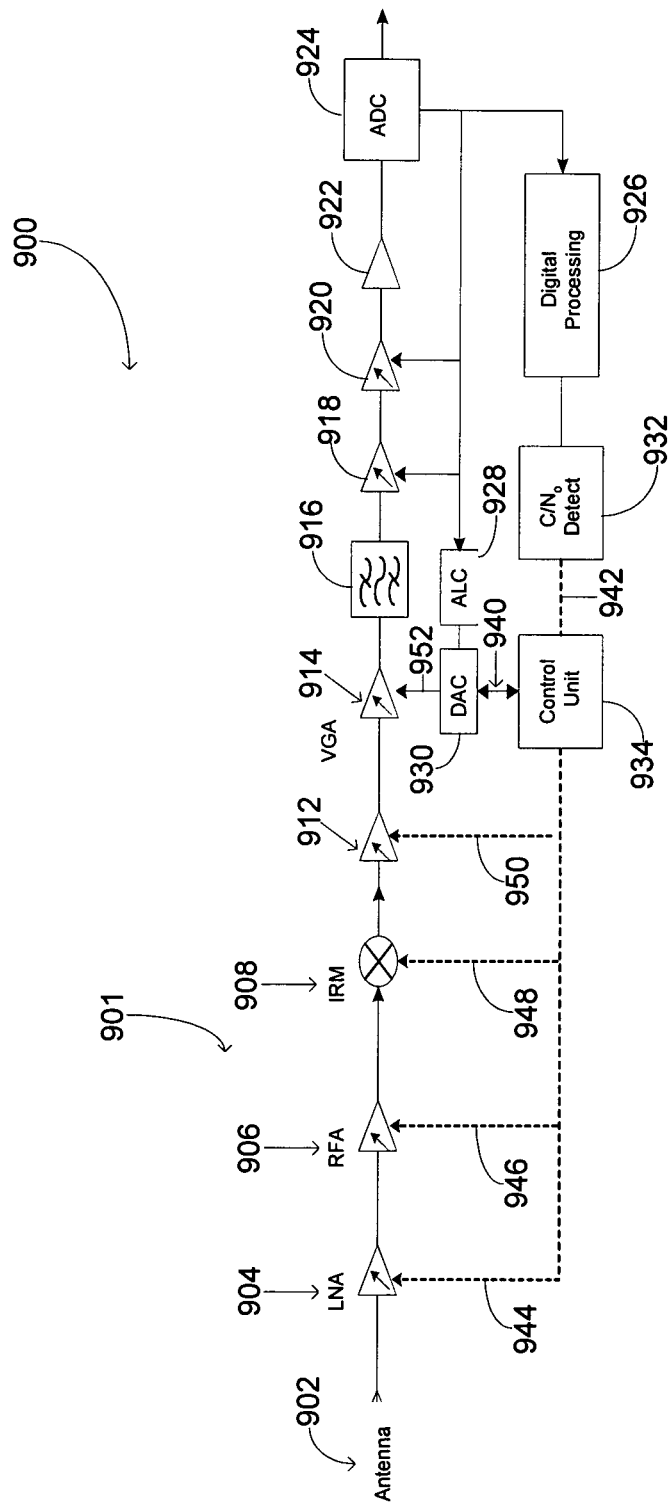
FIG. 9 is a block diagram of an example signal receiver having adaptively optimized noise-figure and/or gain of one or more elements in the receiver.

FIG. 9 is a block diagram of an example GPS signal receiver 900 having adaptively optimized noise-figure and/or gain of one or more elements in the receiver 900. The GPS signal receiver 900 includes an antenna 902, the components or blocks or elements that make up a RF receiver element 901, an ADC 924, a digital processing unit 926, a C/N detect function 932, and a control unit 934. The RF receiver elements 901 include a LNA 904, a variable gain radio frequency amplifier (RFA) 906, an image reject mixer (IRM) 908, a second variable gain amplifier (VGA) 912, a third VGA 914, a bandpass filter 916, a fourth VGA 918, a fifth VGA 920, and a signal amplifier 922. The signal receiver 900 also includes an automatic level control (ALC) 928 and a digital-to-analog converter (DAC) 930.

The receiver elements 901 process the input signal by amplifying, providing image rejection and filtering prior to being input to the ADC 924. The receiver elements 901 process the input signal optimizing the signal quality before converting the signal to digital samples. The first receiver element 901 after the antenna 902 in the signal receiver 900 in FIG. 9 is the LNA 904. The LNA 904 is a variable gain amplifier and may be adjusted as described with reference to FIGS. 1-3 as well as by controlling parameters that adjust the amplifier gain. The LNA 904 current bias, gain and other desired characteristics may be controlled by the control unit 934 via control line 944. The LNA 904 outputs the signal to the first variable gain RFA 906. The current bias and/or the gain of the first variable gain RFA 906 may be controlled by the control unit 934 via control line 946. The first variable gain RFA 906 outputs the signal to the IRM 908, which mixes the signal with a locally generated signal to cancel any image signals. One or more variables, such as bias current and impedance, of the IRM 908 may be controlled by the control unit 934 via control line 948. The image-canceled signal is output to the second VGA 912, which may be controlled by the control unit 934 via control line 950.

The third VGA 914 may be controlled by the control unit 934 via control line 952, which may be output from the DAC 930. The DAC 930 converts a digital output from the ALC 928 to an analog signal that controls the VGA gain. The digital ALC circuit 928 counts and averages the ADC 924 output data over many cycles to determine if it needs to increase or decrease the gain of the VGA 914. The ALC circuit 928 may determine whether the gain is to be increased or decreased by comparing the averaged output data to a set threshold.

The band pass filter 916 filters the output of the third VGA 914 according to a selected frequency band. The filtered signal is coupled to the input of the fourth VGA 918. The gain of the fourth VGA 918 may be controlled by the digital output of the ADC 924. The filtered signal output by the fourth VGA 918 is coupled to the input of the fifth VGA 920. The gain of the fifth VGA 920 may also be controlled by the digital output of the ADC 924. The output of the fifth VGA 920 may be further processed by the signal amplifier 922 and then input to the ADC 924 for conversion to digital form.

The control unit 934 of the signal receiver 900 in FIG. 9 provides controlled feedback to specific RF receiver circuits such as the LNA 904, the first variable gain RFA 906, the IRM 908, and the second VGA 914. The control unit 934 outputs the controlled feedback to adjust the receiver performance from continuously collected information about the receiver's SNR and any automatic gain control loops. The control unit 934 may be programmed to adjust receiver element parameters such as NF or gain, based on desired performance, such as, but not limited to, max SNR or minimum power consumption. The control unit 934 may be connected to the DAC 930 to send and/or receive information used to control the gain of the second VGA 914.

Figure 10:
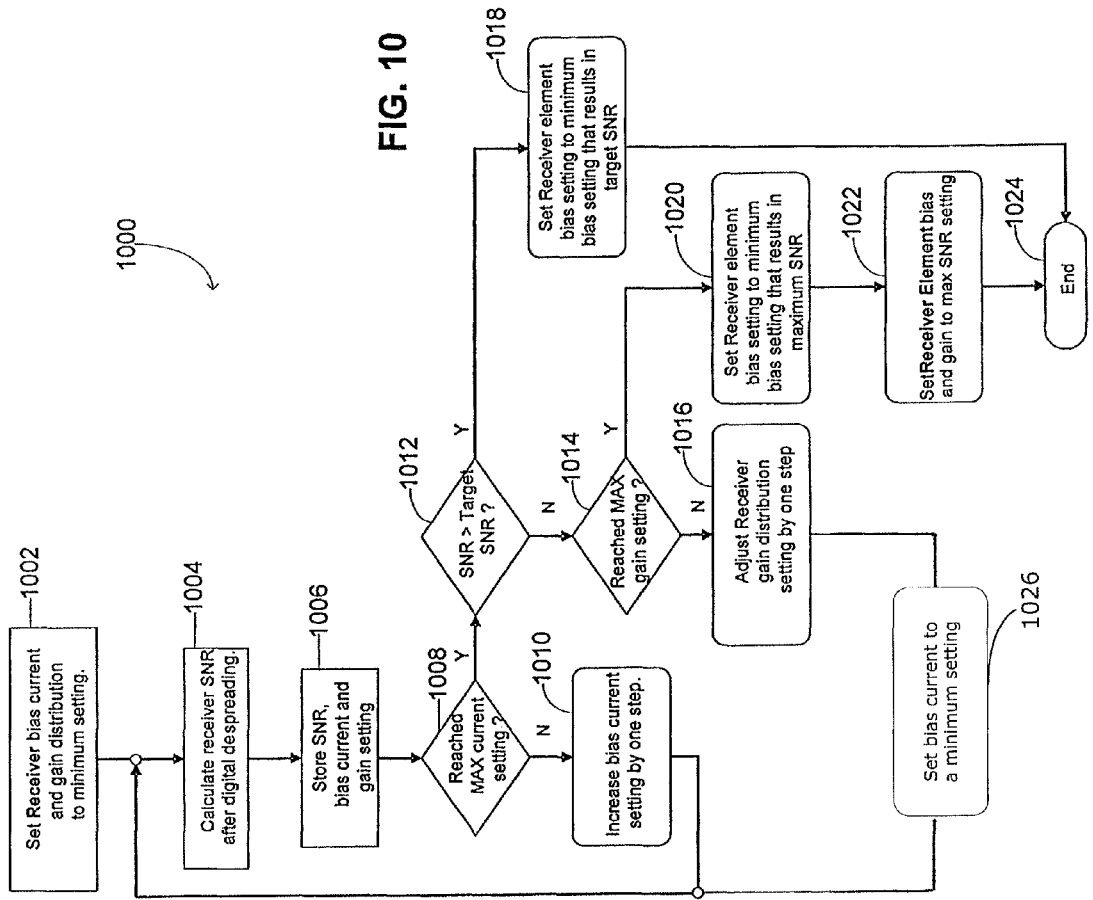
FIG. 10 is a flowchart illustrating operation of an example method for minimizing power consumption by adjusting current bias and gain of one or more elements in the receiver.

FIG. 10 is a flowchart 1000 illustrating operation of an example method for minimizing power consumption by adjusting current bias and gain of one or more elements in the receiver. The example method illustrated by flowchart 1000 may be performed using a signal receiver such as the example signal receiver 900 in FIG. 9. The receiver elements 901 in the signal receiver 900 may include the LNA 904, the first variable gain RFA 906, the IRM 908, the second VGA 912, and the second VGA 914. The receiver elements 901 may be controlled individually or simultaneously or in selected groups. The example flowchart 1000 in FIG. 10 illustrates operation in which more than one receiver element 901 is controlled. The flowchart 1000 refers to the controlled elements as the 'receiver.' The example method illustrated by flowchart 1000 uses a target SNR as a desired performance requirement. Those of ordinary skill in the art will appreciate that the method illustrated by flowchart 1000 is an example and alternative methods may be implemented without departing from the scope of the invention.

At step 1002, the bias current and gain distribution of the receiver are adjusted to their minimum setting. When the bias current and gain distribution are set, the receiver SNR is calculated after digital de-spreading at step 1004. The SNR is stored for later look-up with the bias current setting and the gain setting at step 1006. The bias current setting is checked at decision block 1008 to determine if it is at the maximum current setting for the receiver. If the bias current is not at the maximum current setting, the bias current setting is increased by one step. Steps 1004, 1006, 1008 and 1010 are performed to generate a stored set of data that includes gain settings and SNRs calculated for each bias current level setting. When the maximum current level is reached (the YES condition of decision block 1008), the SNR calculated for the maximum bias current setting tested in decision block 1008 is tested against the target SNR at decision block 1012.

If the SNR is not greater than the target SNR, the gain setting is checked to determine if it is at a maximum gain setting for the receiver at decision block 1014. If the maximum gain setting has not been reached, the receiver gain distribution is adjusted by one step at step 1016. The bias current is set to a minimum setting in step 1026, and the SNR is then calculated at steps 1004, 1006, 1008, and 1010 for the range of current bias levels until the maximum current bias level is reached (YES condition at decision block 1008).

If the SNR is greater than the target SNR (YES condition of decision block 1012), the receiver bias current and gain settings are searched to determine a minimum current setting that yielded an SNR that is at least equal to the target SNR at step 1018. The selected bias current and gain may be retrieved by searching the data collected by performing steps 1004, 1006, 1008, and 1010. At step 1024, operation of the signal receiver continues.

If the maximum gain setting is reached (YES condition of decision block 1014), the SNR data collected by performing steps 1004, 1006, 1008, and 1010 is analyzed to determine the minimum receiver bias current and gain settings that yielded the maximum SNR at step 1020. At step 1022, the receiver bias current and gain are set to the minimum bias current found and gain that yield the maximum SNR. At step 1024, operation of the signal receiver continues.

One of ordinary skill in the art will appreciate that the methods and systems described herein may be implemented using one or more processors having memory resources available for storing program code and data. One skilled in the art will also appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed:

1. A method for adjusting a noise figure in a radio receiver, the method comprising:
   receiving a radio frequency (RF) signal at a RF receiver section comprising at least one RF receiver element, the RF receiver element being controllable by at least two tuning variables;
   processing the RF signal to generate a processed analog signal;
   converting the processed analog signal to a digital signal;
   using the digital signal to determine a noise figure indicative of system level performance; and
   determining a plurality of tuning variable settings for the at least two tuning variables of the at least one RF receiver element to adjust the noise figure,
   comparing the adjusted noise figure to a threshold value and selecting the tuning variable setting corresponding to a lowest power consumption of the at least one RF receiver element and to the noise figure being greater than the threshold value;
   wherein the tuning variables are bias current and gain of the RF receiver element, and
   wherein the bias current and a gain of the RF receiver element are adjusted independently such that 1) the gain is set at a minimum value, 2) the bias current is stepped through each of N current values (N>2) between a minimum current value and a maximum current value while the gain is held at a fixed value 3) the gain is increased by one step towards a maximum value after the bias current reaches the maximum current value, and 4) steps 2 and 3 are repeated until the noise figure is greater than a threshold value.

2. The method of claim 1 further comprising the steps of:
setting a further tuning variable to at least one of the bias current, the impedance, and the gain of the RF receiver element.

3. The method of claim 1 where the step of determining the noise figure includes calculating either the Signal-to-Noise Ratio (SNR) or the Carrier-to-Noise Ratio (CNR) of the radio receiver.

4. The method of claim 1 where the step of determining the tuning variable setting comprising:
setting the tuning variable of the at least one RF receiver element to a minimum tuning variable level;
determining the noise figure at a current tuning variable setting;
storing the noise figure with the current tuning variable setting;
comparing the tuning variable setting to a maximum tuning variable level for the at least one RF receiver element;
if the tuning variable setting is less than the maximum tuning variable level, incrementing the tuning variable setting by an incremental tuning variable level and performing the steps of determining the noise figure, storing the noise figure, and comparing the tuning variable setting to the maximum tuning variable level; and
if the tuning variable setting is not less than the maximum tuning variable level, searching the stored noise figures and setting the tuning variable to the tuning variable setting corresponding to the noise figure stored that is indicative of the highest system performance level.

5. The method of claim 4 further comprising:
selecting another one of the at least RF receiver elements; and
repeating the steps of claim 4 for the selected RF receiver element.

6. The method of claim 4 where the RF receiver section includes more than one RF receiver element controllable by adjusting the bias current, the method further comprising:
before the step of setting the bias current to the minimum bias current, selecting a group of the at least one RF receiver element.

7. The method of claim 4 further comprising the step of:
setting a further tuning variable to at least one of the bias current, the impedance, and the gain of the RF receiver element.

8. The method of claim 4 where the target noise figure is either a target SNR or a target CNR and the step of determining the noise figure includes calculating the target noise figure of the radio receiver and comparing the SNR or CNR to the target noise figure, and the minimum power consumption corresponds to a minimum bias current level that yields the target SNR.

9. The method of claim 4 where the step of determining the tuning variable setting further comprises:
setting the tuning variable to a minimum specified tuning variable level;
processing the RF signal and determining a noise figure;
storing the noise figure with a current tuning variable setting;
comparing the current tuning variable setting to a maximum tuning variable level for the at least one RF receiver element;
if the current tuning variable setting is less than the maximum tuning variable level, incrementing the tuning variable by one incremental current level and performing the steps of determining the noise figure, storing the noise figure, and comparing the tuning variable level to the maximum tuning variable level; and
if the tuning variable level is not less than the maximum tuning variable level, searching the stored noise figure levels and performing the steps of:
setting the tuning variable to the tuning variable setting corresponding to the highest noise figure stored if the highest noise figure is less than the target noise figure; and
setting the tuning variable to the minimum tuning variable setting from the tuning variable settings corresponding to noise figures that are at least as high as the target noise figure if the highest noise figure is not less than the target noise figure.

10. The method of claim 4, wherein the at least one RF receiver element includes a plurality of RF receiver elements, the method further comprising:
selecting another one of the plurality of RF receiver elements; and
repeating the steps of claim 4 for the selected RF receiver element.

11. The method of claim 4 where the RF receiver section includes more than one RF receiver element controllable by adjusting the bias current, the method further comprising:
before the step of setting the bias current to the minimum bias current, selecting a group of RF receiver elements from the more than one RF receiver element.

12. The method of claim 11 where the step of determining the minimum bias current setting further comprises:
storing a range of noise figure levels corresponding to a range of bias current settings between a minimum and a maximum bias current setting by performing the steps of:
setting the bias current to a minimum specified bias current level;
processing the RF signal and determining a noise figure;
storing the noise figure with the bias current setting;
comparing the bias current to a maximum bias current for the at least one RF receiver element;
if the bias current is less than the maximum bias current, incrementing the bias current by one incremental current level and performing the steps of determining the noise figure, storing the noise figure, and comparing the bias current to the maximum bias current; and
if the tuning variable level is not less than the maximum bias current, performing the steps of storing a range of noise figures corresponding to the bias current settings between the minimum and maximum bias current settings for each of a range of variable gain settings; and
setting the bias current to the bias current setting corresponding to the highest noise figure stored if the highest noise figure is less than a target noise figure; and
setting the bias current to the minimum bias current setting from the bias current settings corresponding to noise figures that are at least as high as the target noise figure if the highest noise figure is not less than the target noise figure.

13. The method of claim 12 where the target noise figure is either a target SNR or a target CNR, and the step of determining the noise figure includes calculating the SNR or CNR of the radio receiver and comparing the SNR or CNR to the target noise figure, and the minimum power consumption corresponds to a bias current level that yields the target noise figure.

14. A radio receiver comprising:
a RF receiver section comprising at least one RF receiver element controllable by at least two tuning variables, the RF receiver section operable to generate a processed analog signal;

an analog to digital converter ("ADC") to convert the processed analog signal to a digital signal;
a controller configured to:
determine a noise figure indicative of system level performance using the digital signal,
determine a plurality of tuning variable settings for the at least two tuning variables of the at least one RF receiver element to adjust the noise figure, and
compare the adjusted noise figure to a threshold value and select the tuning variable setting corresponding to a lowest power consumption of the at least one RF receiver element and to the noise figure being greater than the threshold value;
wherein the tuning variables are bias current and gain of the RF receiver element, and
wherein the bias current and the gain of the RF receiver element are adjusted independently such that 1) the gain is set at a minimum value, 2) the bias current is stepped through each of N current values (N>2) between a minimum current value and a maximum current value while the gain is held at a fixed value 3) the gain is increased by one step towards a maximum value after the bias current reaches the maximum current value, and 4) steps 2 and 3 are repeated until the noise figure is greater than a threshold value.

15. The RF receiver of claim 14 where the controller selects a SNR or a CNR of the RF receiver as the noise figure, selects a bias current of at least one RF receiver element as the at least one tuning variable, the controller further including:
a tuning function to determine the bias current for the at least one RF receiver element that results in the maximum SNR or CNR.

16. The RF receiver of claim 14 where the at least one RF receiver element is a low-noise amplifier.

17. The RF receiver of claim 14 where the at least one RF receiver element includes a group of receiver elements selected from a group consisting of a low-noise amplifier, a RF amplifier, a signal amplifier, a variable gain amplifier, an image rejection mixer (IRM), a digital-to analog converter (DAC), and an automatic loop controller (ALC).

18. The RF receiver of claim 14 where the controller selects the SNR or CNR of the RF receiver as the noise figure, selects a bias current of the RF receiver elements as the at least one tuning variable, the controller further including:
a tuning function to determine the bias current for the RF receiver elements that results in a minimum power consumption that results in the SNR or CNR being at least equal to a target SNR or CNR.

19. The RF receiver of claim 14 where the controller selects the SNR or CNR of the RF receiver as the noise figure, selects a bias current and a variable gain as the tuning variables of the RF receiver elements, the controller further including:
a tuning function to determine the bias current for the RF receiver elements that results in a minimum power consumption that results in the SNR or CNR being at least equal to a target SNR or CNR, the bias current being determined over a selected range of variable gains.

20. A system for controlling a radio receiver section comprising at least one RF receiver element controllable by at least two tuning variables, the RF receiver section operable to generate a processed analog signal, the system comprising:
an analog to digital converter ("ADC") to convert the processed analog signal to a digital signal;
a controller configured to:
determine a noise figure indicative of system level performance using the digital signal,
determine a plurality of tuning variable settings for the at least two tuning variables of the at least one RF receiver element to adjust the noise figure, and
compare the adjusted noise figure to a threshold value and select the tuning variable setting corresponding to a lowest power consumption of the at least one RF receiver element and to the noise figure being greater than the threshold value;
wherein the tuning variables are bias current and gain of the RF receiver element, and
wherein the bias current and the gain of the RF receiver element are adjusted independently such that 1) the gain is set at a minimum value, 2) the bias current is stepped through each of N current values (N>2) between a minimum current value and a maximum current value while the gain is held at a fixed value 3) the gain is increased by one step towards a maximum value after the bias current reaches the maximum current value, and 4) steps 2 and 3 are repeated until the noise figure is greater than a threshold value.

21. The system of claim 20 where the controller selects a SNR or CNR of the RF receiver as the noise figure, selects a bias current of at least one RF receiver element as the at least one tuning variable, the controller further including:
a tuning function to determine the bias current for the at least one RF receiver element that results in the maximum SNR or CNR.

22. The system of claim 20 where the at least one RF receiver element is a low-noise amplifier.

23. The system of claim 20 where the at least one RF receiver element includes a group of receiver elements selected from a group consisting of a low-noise amplifier, a RF amplifier, a signal amplifier, a variable gain amplifier, an image rejection mixer (IRM), a digital-to analog converter (DAC), and an automatic loop controller (ALC).

24. The system of claim 20 where the controller selects the SNR or CNR of the RF receiver as the noise figure, selects a bias current of the RF receiver elements as the at least one tuning variable, the controller further including:
a tuning function to determine the bias current for the RF receiver elements that results in a minimum power consumption that results in the SNR or CNR being at least equal to a target SNR or CNR.

25. The system of claim 20 where the controller selects the SNR or CNR of the RF receiver as the noise figure, selects a bias current and a variable gain as the tuning variables of the RF receiver elements, the controller further including:
a tuning function to determine the bias current for the RF receiver elements that results in a minimum power consumption that results in the SNR or CNR being at least equal to a target SNR or CNR, the bias current being determined over a selected range of variable gains.

* * * * *

UNITED STATES PATENT AND TRADEMARK OFFICE
CERTIFICATE OF CORRECTION

PATENT NO. : 8,699,984 B2  
APPLICATION NO. : 12/036946  
DATED : April 15, 2014  
INVENTOR(S) : Mendoza et al.

Page 1 of 1

It is certified that error appears in the above-identified patent and that said Letters Patent is hereby corrected as shown below:

In the Specification

In Column 3, Line 40, delete "antenna 204." and insert -- antenna 202. --, therefor.

In Column 9, Line 10, delete "second VGA 914." and insert -- second VGA 912. --, therefor.

In Column 9, Line 19, delete "second VGA 914." and insert -- second VGA 912. --, therefor.

In Column 9, Line 28, delete "second VGA 914." and insert -- second VGA 912. --, therefor.

In the Claims

In Column 10, Line 63, in Claim 1, delete "fixed value" and insert -- fixed value, --, therefor.

In Column 13, Line 21, in Claim 14, delete "fixed value" and insert -- fixed value, --, therefor.

In Column 14, Line 22, in Claim 20, delete "fixed value" and insert -- fixed value, --, therefor.

Signed and Sealed this  
Twenty-third Day of September, 2014

Michelle K. Lee  
*Deputy Director of the United States Patent and Trademark Office*